April 4, 1939.  J. L. HAYS  2,152,804
TRUCK FOR MOVING BUILDINGS
Filed March 8, 1938   2 Sheets-Sheet 1
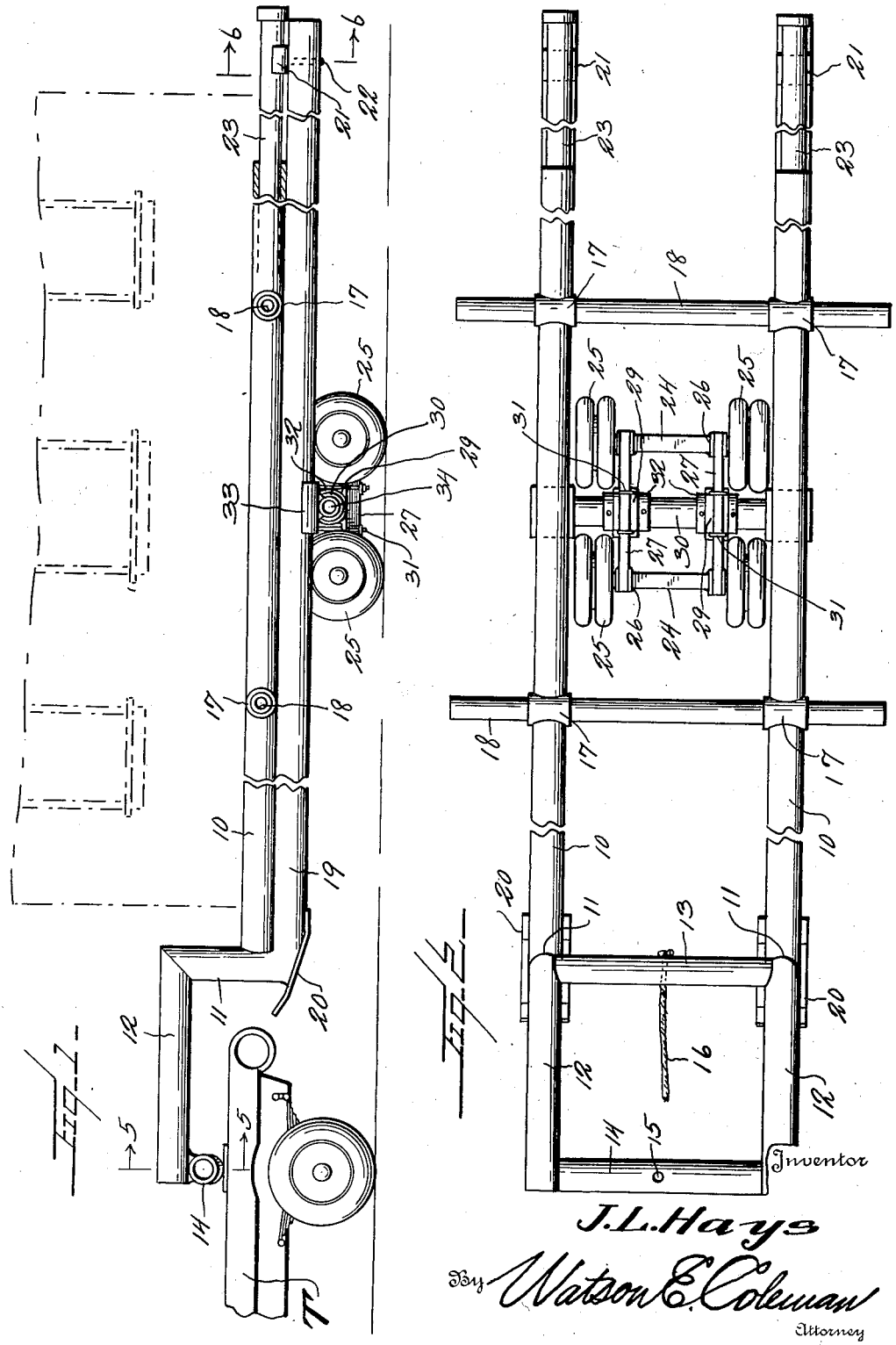
Inventor
J. L. Hays
By Watson E. Coleman
Attorney April 4, 1939.　　　　J. L. HAYS　　　　2,152,804
TRUCK FOR MOVING BUILDINGS
Filed March 8, 1938　　　2 Sheets-Sheet 2
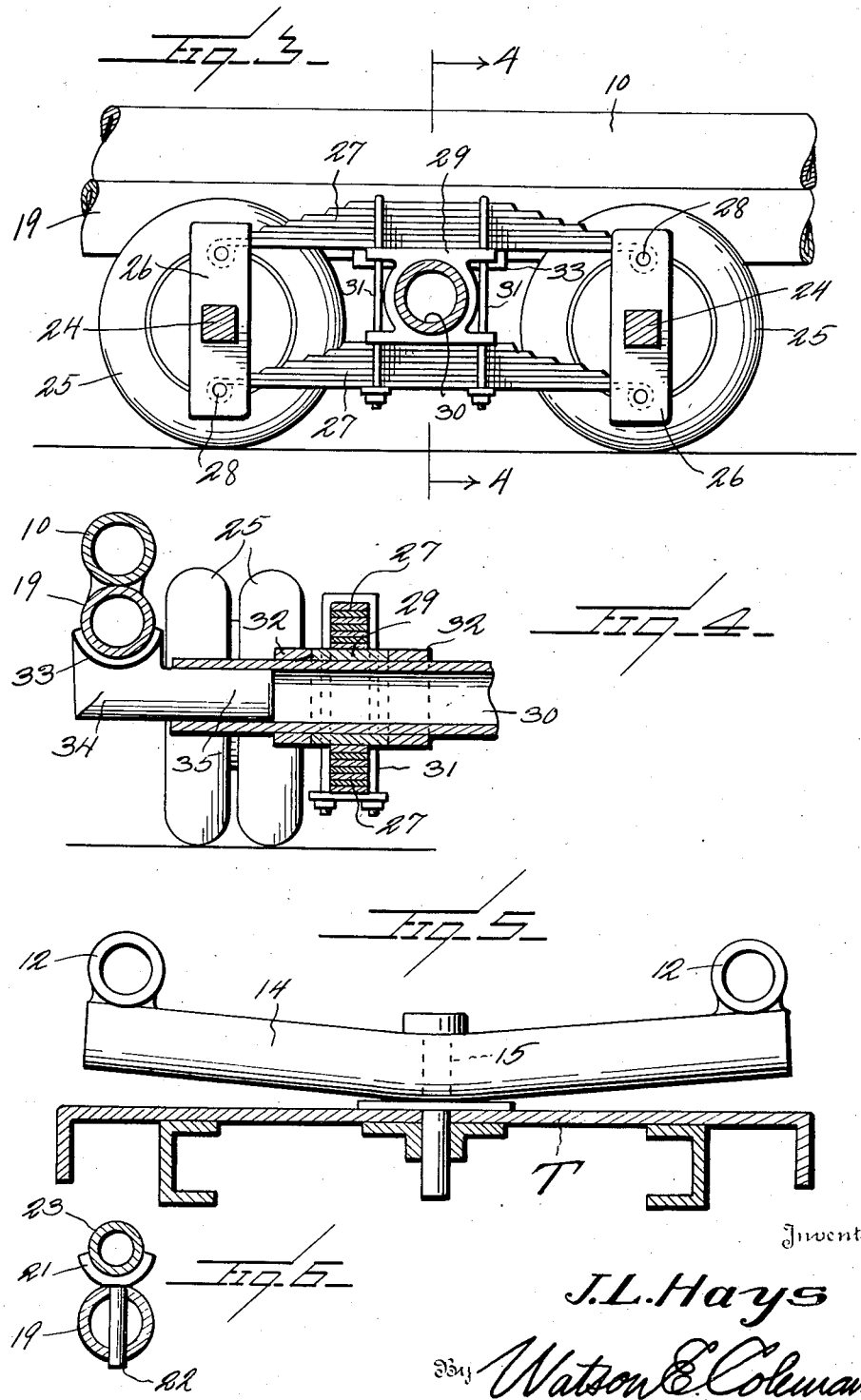
Inventor
J.L.Hays
By Watson E. Coleman
Attorney Patented Apr. 4, 1939

2,152,804

UNITED STATES PATENT OFFICE 2,152,804

TRUCK FOR MOVING BUILDINGS

James L. Hays, Seminole, Okla.

Application March 8, 1938, Serial No. 194,683

2 Claims. (Cl. 280—106)

This invention relates to trucks or skids for moving heavy structures such as houses, oil well apparatus and the like, and particularly to trucks of this character which include two parallel longitudinally extending tubular elements braced from each other and having means at their forward ends whereby the frame thus formed may be supported upon and engaged with a draft vehicle, the frame being supported upon a truck.

The general object of the present invention is to provide a structure of this character which is particularly adapted for supporting and moving heavy structures and which is provided with a supporting truck, not attached to the frame but entirely separate therefrom, the supporting truck having seats with which the frame may be engaged and upon which the frame will rest, the truck being movable into any desired position along the length of the frame elements.

Another object in this connection is to so construct the seats upon which the elements are supported that each seat is free to rock in a plane longitudinal of the truck, which permits the frame to equalize itself on uneven ground and secure a certain degree of flexibility between the frame and the supporting truck.

A further object is to provide the truck itself with a transverse tubular beam supported by the springs of the truck, this beam being so constructed as to equalize itself on uneven ground.

A still further object is to provide a frame such as heretofore stated with a raised portion at its forward end and mud shoes just rearward of this raised portion.

Still another object is to provide the tubular frame with transversely extending eyes at intervals through which transverse tubular bars may be placed to extend on each side beyond the frame and thus support the outside walls of buildings which are being moved, and another object is to provide means whereby the tubular frame may be increased in length when necessary.

Other objects will appear in the course of the following description.

My invention is illustrated in the accompanying drawings wherein:—

Fig. 1 is a side elevation of a moving truck constructed in accordance with my invention;

Fig. 2 is a top plan view thereof;

Fig. 3 is a side elevation of the wheeled supporting truck;

Fig. 4 is a section on the line 4—4 of Fig. 3;

Fig. 5 is a section on the line 5—5 of Fig. 1;

Fig. 6 is a section on the line 6—6 of Fig. 1.

By referring to these drawings, it will be seen that the frame of the truck is made of heavy pipe having any desired or necessary diameter and any desired length. The frame includes two of these longitudinally extending tubular beams designated 10. At the forward ends, these tubular beams are connected to vertical members 11, also tubular, which in turn connect with forwardly extending tubular members 12. A brace 13 connects the members 12 at their junction with the members 11. Attached to the forward ends of the elements 12 and disposed below these elements is a transverse tubular beam 14 which is preferably slightly bowed downward and is formed at its middle with an opening 15. The member 14 constitutes a bolster and a king pin may be passed through the opening 15 by which the bolster may be held on the draft truck T or vehicle while being pulled. This bolster is round so that it can be pulled up on the draft truck by a winch line 16, this winch line being attached to the brace 13.

The longitudinal tubular beams 10 which constitute what are known as main "skids" are formed at intervals with transversely extending eyes 17 through which transverse pipes or beams 18 may be passed. The pipes 18 are loose within these eyes and are inserted whenever desired or necessary, for the purpose of increasing the effective width of the frame.

In order to make the frame particularly rigid and strong, a second pair of pipes or tubular beams 19 are rigidly engaged with the tubular beams or pipes 10 and disposed below the same. These pipes 19 extend beyond the rear ends of the pipes 10 and terminate at their forward ends beneath the upstanding members 11. Wide mud shoes 20 are attached to the forward ends of the beams 19, as shown. These mud shoes are of flat iron ordinarily about 1" thick and 1 ft. wide and 2½ ft. long. They enable the "skids" to be dragged on the ground easily when necessary. The rear ends of the members 19 carry the transversely concave seats 21 having stems 22 inserted in vertical openings in the pipes 19. If it is desired to increase the effective length of the truck, tubular elements 23 are inserted in the rear ends of the pipes 10, these tubular elements resting upon the seats 21. The elements 23 may be telescoped to a greater or less extent into the pipes 10 as may be found necessary. It is to be understood that the pipes 10 and 19 may be welded to each other at intervals or otherwise rigidly engaged with each other.

The supporting truck for the frame includes axles 24 upon which the wheels 25 are mounted.

These axles pass through vertical bars 26. There are a pair of these bars at the rear of the truck and a pair at the forward end of the truck. Upper and lower sets of leaf springs 27 are provided, the eyes 28 of these springs being bolted, shackled or otherwise connected to the upper and lower ends of the bars 26. Mounted between these springs are bearings 29 which support a transversely extending tubular beam 30 open at its ends. The bearings are held to the springs by the U-bolts 31 and the tubular beam is provided with collars 32 associated with the bearings 29 and preventing lateral movement of the beam 30. It will be seen that this tubular beam 30 is supported by the springs 27. It is this tubular beam which supports the rear portion of the main frame or main skids formed by the members 10 and 19.

For the purpose of supporting the main frame upon the tubular beam 30, I provide at each end a concave seat 33 carried by an angular member 34 having a transversely extending stem 35 adapted to be inserted within the corresponding end of the tubular beam 30 and have rocking movement therein. Each seat 33 is independent of the other seat and thus they rock independently of each other in the longitudinal plane of the frame. It will be, of course, noted that the supporting truck may be shifted to any position beneath the frame either adjacent the forward end thereof or adjacent the rear end thereof or in the middle and thus may be disposed in exactly the right position to secure a proper balance for the frame and the structure carried thereby.

This building moving truck is built so that the truck can be turned squarely around to the building which is to be disposed thereon. The frame may be increased in length or shortened to fit any size building. As before stated, a winch line or two winch lines extend from the brace 13 to the winch on the draft truck (not shown). This line is adapted to pick up or raise the forward end of the house moving skids or frame and after the front end is picked up level with the back end of the truck with the rear end of the skids resting on the ground, then the operator blocks up the skids or supporting frame just forward of the center thereof. The winch is then released and the forward end of the supporting frame swings downward under the weight of the building, then the supporting truck is placed under the skids and then the forward end of the frame is again raised by the winch until it rests upon the draft truck and the blocks are removed. A king pin is then inserted through the opening 15 into the draft truck and the apparatus is ready to be moved from one situation to another. The building can be unloaded from the truck as easily as it can be loaded onto the truck which eliminates the danger from blocking and falling necessitated by the old-style method. This is particularly due to the fact that the supporting truck is not attached to the frame but is free to be moved into or out of supporting engagement with the frame and be disposed at any place along the length of the frame where the structure being moved will be properly balanced. As before stated, the transverse bars 18 may be disposed in any one or all of the eyes 17 so as to extend beyond the frame and act as supports for the outer walls of houses or other structures which would be too wide for the relatively narrow main frame, this main frame having a width approximately equal to the width of the ordinary truck.

While I have illustrated certain details of construction and arrangement of parts, I wish it understood that these might be varied in many ways without departing from the principle of the invention as defined in the appended claims.

What is claimed is:

1. A structure of the character described, including a frame comprising a pair of laterally spaced longitudinally extending tubular beams, a second pair of longitudinally extending tubular beams disposed below and rigidly engaged with the first-named beams and extending beyond the first-named beams, the rear ends of the second-named beans having transversely curved rests mounted thereon, and auxiliary beams insertible into the upper pair of tubular beams and supported by said rests whereby to increase the effective length of the structure.

2. A structure of the character described, including a frame comprising a pair of laterally spaced longitudinally extending tubular beams, a second pair of longitudinally extending tubular beams disposed below and rigidly engaged with the first-named beams, vertical tubular elements extending upward from and rigidly connected with the forward ends of the pairs of longitudinal beams and then extending forward, a brace connecting the forwardly extending portions of said beams, a downwardly curved bolster connected to the forward ends of said forwardly extending portions and having a king pin opening, mud shoes mounted below the forward ends of the lower pair of beams, and a supporting truck for the frame.

JAMES L. HAYS.